United States Patent [19]

Shiraishi

[11] Patent Number: 4,797,921

[45] Date of Patent: Jan. 10, 1989

[54] SYSTEM FOR ENCIPHERING OR DECIPHERING DATA

[75] Inventor: Takayoshi Shiraishi, Chigasaki, Japan

[73] Assignee: Hitachi, Ltd., Tokyo, Japan

[21] Appl. No.: 796,753

[22] Filed: Nov. 12, 1985

[30] Foreign Application Priority Data

Nov. 13, 1984 [JP] Japan .................................. 59-239243
Dec. 26, 1984 [JP] Japan .................................. 59-272909

[51] Int. Cl.$^4$ ........................... H04K 1/00; H04K 9/00
[52] U.S. Cl. ........................................ 380/28; 380/30; 380/44; 380/46
[58] Field of Search ............... 178/22.10, 22.19, 22.15, 178/22.14; 380/28, 30, 44, 46, 50

[56] References Cited

U.S. PATENT DOCUMENTS

| | | |
|---|---|---|
| 3,535,642 | 10/1970 | Perlman . |
| 3,681,708 | 8/1972 | Olmstead . |
| 3,691,472 | 9/1972 | Bohman . |
| 3,838,259 | 9/1974 | Kortenhaus . |
| 3,911,216 | 10/1975 | Bartek et al. . |
| 4,165,444 | 8/1979 | Gordon ............................ 178/22.10 |
| 4,520,232 | 5/1985 | Wilson ............................. 178/22.19 |

OTHER PUBLICATIONS

*Webster's Ninth New Collegiate Dictionary;* (1984), p. 639; Merriam-Webster, Inc.
"Cryptography and Data Security", by Dorothy Elizabeth Denning, Copyright 1982.

*Primary Examiner*—Salvatore Cangialosi
*Assistant Examiner*—Bernarr E. Gregory
*Attorney, Agent, or Firm*—Antonelli, Terry & Wands

[57] ABSTRACT

A system for enciphering or deciphering wherein bit patterns in a binary number notation of a plurality of elements, which an irreducible polynomial in the Galois field GF ($2^i$) has, are stored in registers arranged in a certain correspondence with the bit positions of input data or messages, as random numbers for an encryption key or decryption key. The bit patterns retained in the registers corresponding to the digit of bit "1" in the input data are subjected to a mod 2 addition operation independently for each digit of the random numbers, to thereby obtain encipher or decipher data corresponding to the input data. The elements to be used for the encipher and decipher keys have a specific relationship therebetween in conformity with the periodical characteristic of the elements the irreducible polynomial has.

3 Claims, 4 Drawing Sheets

FIG. 3

| | $x^5$ | $x^4$ | $x^3$ | $x^2$ | $x^1$ | $x^0$ | | M | |
|---|---|---|---|---|---|---|---|---|---|
| $X^{12}$ | 0 | 0 | 0 | 1 | 0 | 1 | ~16 | 0 | $m^5$ |
| $X^{11}$ | 1 | 0 | 0 | 0 | 1 | 1 | ~15 | 1 | $m^4$ |
| $X^{10}$ | 1 | 1 | 0 | 0 | 0 | 0 | ~14 | 0 | $m^3$ |
| $X^9$ | 0 | 1 | 1 | 0 | 0 | 0 | ~13 | 1 | $m^2$ |
| $X^8$ | 0 | 0 | 1 | 1 | 0 | 0 | ~12 | 0 | $m^1$ |
| $X^7$ | 0 | 0 | 0 | 1 | 1 | 0 | ~11 | 1 | $m^0$ |

| | $x^5$ | $x^4$ | $x^3$ | $x^2$ | $x^1$ | $x^0$ | | S | |
|---|---|---|---|---|---|---|---|---|---|
| $X^{61}$ | 1 | 1 | 0 | 0 | 0 | 1 | ~16' | 1 | $s^5$ |
| $X^{60}$ | 1 | 1 | 1 | 0 | 0 | 1 | ~15' | 1 | $s^4$ |
| $X^{59}$ | 1 | 1 | 1 | 1 | 0 | 1 | ~14' | 1 | $s^3$ |
| $X^{58}$ | 1 | 1 | 1 | 1 | 1 | 1 | ~13' | 1 | $s^2$ |
| $X^{57}$ | 1 | 1 | 1 | 1 | 1 | 0 | ~12' | 0 | $s^1$ |
| $X^{56}$ | 0 | 1 | 1 | 1 | 1 | 1 | ~11' | 1 | $s^0$ |

D~ | 0 | 1 | 0 | 1 | 0 | 1 | ~4'

$m^5$ $m^4$ $m^3$ $m^2$ $m^1$ $m^0$

SYSTEM FOR ENCIPHERING OR DECIPHERING DATA

BACKGROUND OF THE INVENTION (1) Field of the Invention

The present invention relates to a system for enciphering or deciphering data, and more particularly to a system for enciphering or deciphering data or messages by multiplying them by pseudorandom numbers.

(2) Description of the Prior Art

Recently, in an on-line system such as a bank system, protection of transmission data through encryption has strongly been requested in order to prevent illegal access to the transmission data and its abuse through cryptoanalysis. Not only the protection for transmission data through encryption, but also the protection for file data within a computer system has also been requested heretofore.

Of conventional data encryption systems, there are known systems in which pseudorandom numbers are added to data, as proposed for example in U.S. Pat. Nos. 3,535,642, 3,681,708, 3,691,472, 3,816,764, 3,838,259, 3,911,216. In these known systems, basically the bit patterns of transmission data and pseudorandom numbers are added together at each of the corresponding bits of the respective data and the resultant bit pattern is transmitted as a cipher message. With such system, if there is only one terminal for destination of a message, i.e., in case of an end-to-end type communication network, both sending and receiving terminals may suffice only if they have a single common stream of pseudorandom numbers as a cipher key for enciphering and deciphering. However, if the number of terminals in a communication network increases, then it is necessary to use a plurality of particular cipher keys for respective pairs of sending and receiving terminals. This results in a large number of cipher keys which must be prepared for the whole communication system.

The number of types of cipher keys may be reduced by allocating a particular cipher key for each communication channel. For instance, as shown in FIG. 1, in a system where terminals A, B, C, D and E are connected to each other via nodes $P_1$, $P_2$ and $P_3$, the number of cipher keys necessary for each terminal becomes minimum on condition that different streams of pseudorandom numbers $C_1$ to $C_7$ are prepared for respective communication channels and enciphering and deciphering are performed by using as a cipher key $C_1$ for the channel from A to $P_1$, $C_2$ for the channel from $P_1$ to $P_2$, $C_3$ for the channel from $P_2$ to $P_3$ and $C_4$ for the channel from $P_3$ to B. However, if the above-noted encryption using an independent cipher key for each communication channel is employed for an encryption system where a transmission message and a stream of pseudorandom numbers are added together (EXCLUSIVE OR operation), there arises a possibility of a cryptoanalysis of the message by performing an AND operation, relative to the same plain text, of the cipher texts obtained from a plurality of communication channels. Thus, data protection is not sufficient.

Among other encryption systems, also known is an American encryption standard system by the Department of Commerce of U.S. Government. This system however requires complicated circuits in order to perform iterative operations of combinations of substitution and transposition processings for the input data.

SUMMARY OF THE INVENTION

It is an object of the present invention to provide a system which has little risk of cipher data being illegally cryptoanalized and is capable of enciphering or deciphering the data with a simple circuit arrangement.

It is another object of the present invention to provide an enciphering or deciphering system having an extremely high degree of freedom in selection and alteration of cipher keys.

It is a further object of the present invention to provide a system capable of enciphering and deciphering data by using the same circuit construction and changing only the cipher keys.

It is a still further object of the present invention to provide an enciphering system capable of transposition of the bit positions of a cipher text by using a selected set of cipher keys.

In order to achieve the above objects, the system for enciphering or deciphering i binary digit data according to the present invention comprises:

first store means for temporarily storing input data to be enciphered or deciphered;

second store means for storing a plurality of streams of i binary digit random numbers, each stream corresponding to each digit of said first store means; and output means for outputting a signal as encryption or decryption data for said input data, said signal being obtained by performing mod 2 addition of the streams of random numbers, among a plurality of streams stored in said second store means, which correspond to those digits of the input data stored in said first store means and having "1" bit, said addition being performed independently for each digit of said random numbers.

A consecutive set of elements is used as said plurality of streams of random numbers, the set of elements being selected from the finite number of elements of an irreducible polynomial f(x) in the Galois field ($2^i$). These elements can be expressed in a binary bit pattern when they are expressed in a polynomial form and the degree of x terms is made to correspond to the binary number digit. The enciphering system of the invention utilizes the characteristic of an irreducible polynomial and generates encryption data by performing a partial product operation between the inputted data and random number patterns. Also in deciphering, the original data is reproduced from a partial product operation between the inputted cipher data and random number patterns.

These and other objects, features, and uses will become more apparent as the description proceeds, when considered with the accompanying drawings.

BRIEF DESCRIPTION OF THE DRAWINGS

FIG. 3 is a table for explaining the principle of enciphering a message according to the present 0180 invention;

FIG. 4 is a table for explaining the principle of deciphering a cipher text according to the present invention;

DESCRIPTION OF THE PREFERRED EMBODIMENT

Figure 1:
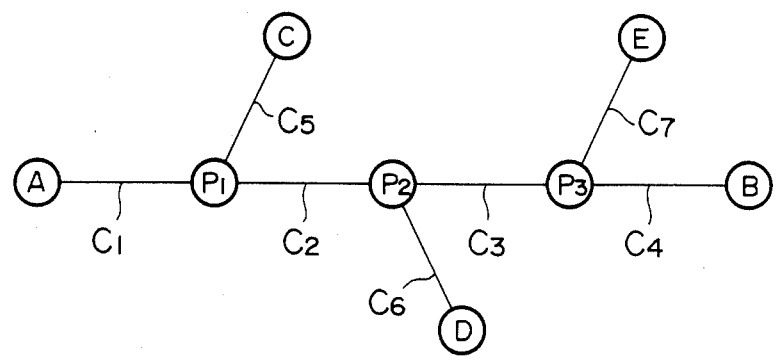
FIG. 1 is a schematic diagram showing a data communication network for enciphering and deciphering data.
Figure 2:
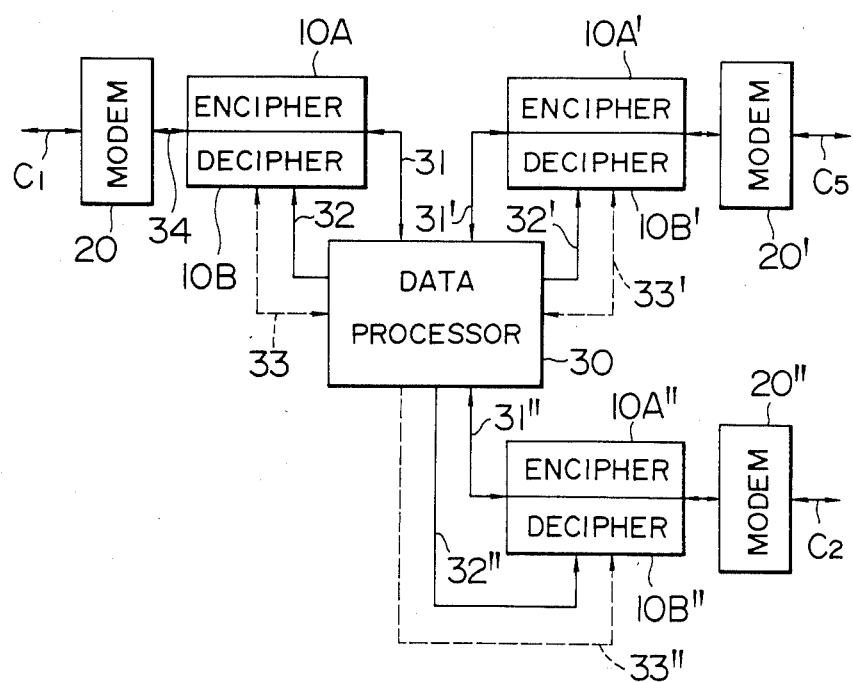
FIG. 2 is a block diagram showing a schematic construction of a node in a data communication network.

FIG. 2 is a block diagram schematically showing the construction of the node $P_1$ in the communication network of FIG. 1. The node $P_1$ is provided with a data processor 30 for operation of a data exchange, modems 20, 20' and 20" between data communication channels $C_1$, $C_2$ and $C_5$, encipher circuits 10A, 10A' and 10A" and decipher circuits 10B, 10B' and 10B". A cipher text from the data communication channel $C_1$ received at the modem 20 is deciphered into a plain text at the decipher circuit 10B, and inputted to the processor 30 via a signal bus 31. Alternatively, a message to be transmitted on the communication channel $C_1$ is transferred via the signal bus 31 to the encipher circuit 10A where it is enciphered into a cipher text and thereafter transmitted via the modem 20. A stream of random numbers used as a cipher key for enciphering and deciphering is supplied via a signal line 32 from the processor 30 to the circuits 10A and 10B. Reference numeral 33 denotes a control signal line for data transmission. The encipher circuits 10A' and 10A" and decipher circuits 10B' and 10B" between the data communication channels $C_2$ and $C_5$ and the processor 30, are constructed similarly to the circuits 10A and 10B.

According to the present invention, in the encipher circuits 10A, 10A' and 10A" and decipher circuits 10B, 10B' and 10B", a cipher key is used which is expressed as will be described later in a polynomial form of a set of elements selected from a plurality of elements obtained in association with an irreducible polynomial in the Galois field $GF(2^i)$.

An irreducible polynomial in the Galois field $GF(2^i)$ is generally expressed in the form of:

$$F_i(x) = a_i \cdot x^i + a_{i-1} \cdot x^{i-1} + \ldots + a_1 \cdot x^1 + a_0 \quad (1)$$

Any desired element $x^n$ can be identified by performing a mod $f_i(x)$ operation, i.e., by obtaining a remainder through division of $X^n$ by $f_i(x)$, and expressed by a sum of $x^{i-1}$ to $x^0$ as in the following equation where $b_{i-1}, \ldots, b_0$ are constants of "1" or "0".

$$X^n \equiv b_{i-1} \cdot x^{i-1} + b_{i-1} \cdot x^{i-2} + \ldots + b_1 \cdot x + b_0 \pmod{f_i(x)} \quad (2)$$

Here, as an example of an irreducible polynomial in the Galois field $GF(2^6)$, the following equation is used.

$$f(x) = x^6 + x + 1 \quad (3)$$

The above polynomial is an irreducible primitive polynomial having $i=6$ as the maximum degree of x. As shown in Table 1, all of the elements $X^n$ expressed in a power form can be expressed as a polynomial $f_i(x)$ formed of a sum of 1, x, $x^2$, $x^3$, $x^4$ and $x^5$. The number g of elements is $(2^i - 1)$ since the element of the order 63 equals the value of $X^0$.

The equation 3 can be expressed as a binary number of "1000011" by making the term of 6 order x correspond to the uppermost bit and the term of 0 order x to the lowermost bit. Simiarily, each element of Table 1 can be expressed in a 6 digit binary number.

TABLE 1

| $X^n$ | $X^n = F \pmod{f_{(x)}}$ | $X^n$ | $X^n = F \pmod{f_{(x)}}$ |
|---|---|---|---|
| $X^0$ | 1 | $X^{32}$ | $x^3 + 1$ |
| $X^1$ | x | $X^{33}$ | $x^4 + x$ |
| $X^2$ | $x^2$ | $X^{34}$ | $x^5 + x^2$ |
| $X^3$ | $x^3$ | $X^{35}$ | $x^3 + x + 1$ |
| $X^4$ | $x^4$ | $X^{36}$ | $x^4 + x^2 + x$ |
| $X^5$ | $x^5$ | $X^{37}$ | $x^5 + x^3 + x^2$ |
| $X^6$ | $x + 1$ | $X^{38}$ | $x^4 + x^3 + x + 1$ |
| $X^7$ | $x^2 + x$ | $X^{39}$ | $x^5 + x^4 + x^2 + x$ |
| $X^8$ | $x^3 + x^2$ | $X^{40}$ | $x^5 + x^3 + x^2 + x + 1$ |
| $X^9$ | $x^4 + x^3$ | $X^{41}$ | $x^4 + x^3 + x^2 + x + 1$ |
| $X^{10}$ | $x^5 + x^4$ | $X^{42}$ | $x^5 + x^4 + x^3 + x$ |
| $X^{11}$ | $x^5 + x + 1$ | $X^{43}$ | $x^5 + x^4 + x^2 + x + 1$ |
| $X^{12}$ | $x^2 + 1$ | $X^{44}$ | $x^5 + x^3 + x^2 + 1$ |
| $X^{13}$ | $x^3 + x$ | $X^{45}$ | $x^4 + x^3 + 1$ |
| $X^{14}$ | $x^4 + x^2$ | $X^{46}$ | $x^5 + x^4 + x$ |
| $X^{15}$ | $x^5 + x^3$ | $X^{47}$ | $x^5 + x^2 + x + 1$ |
| $X^{16}$ | $x^4 + x + 1$ | $X^{48}$ | $x^3 + x^2 + 1$ |
| $X^{17}$ | $x^5 + x^2 + x$ | $X^{49}$ | $x^4 + x^3 + x$ |
| $X^{18}$ | $x^3 + x^2 + x + 1$ | $X^{50}$ | $x^5 + x^4 + x^2$ |
| $X^{19}$ | $x^4 + x^3 + x^2 + x$ | $X^{51}$ | $x^5 + x^3 + x + 1$ |
| $X^{20}$ | $x^5 + x^4 + x^3 + x^2$ | $X^{52}$ | $x^4 + x^2 + 1$ |
| $X^{21}$ | $x^5 + x^4 + x^3 + x + 1$ | $X^{53}$ | $x^5 + x^3 + x$ |
| $X^{22}$ | $x^5 + x^4 + x^2 + 1$ | $X^{54}$ | $x^4 + x^2 + x + 1$ |
| $X^{23}$ | $x^5 + x^3 + 1$ | $X^{55}$ | $x^5 + x^3 + x^2 + x$ |
| $X^{24}$ | $x^4 + 1$ | $X^{56}$ | $x^4 + x^3 + x^2 + x + 1$ |
| $X^{25}$ | $x^5 + x$ | $X^{57}$ | $x^5 + x^4 + x^3 + x^2 + x$ |
| $X^{26}$ | $x^2 + x + 1$ | $X^{58}$ | $x^5 + x^4 + x^3 + x^2 + x + 1$ |
| $X^{27}$ | $x^3 + x^2 + x$ | $X^{59}$ | $x^5 + x^4 + x^3 + x^2 + 1$ |
| $X^{28}$ | $x^4 + x^3 + x^2$ | $X^{60}$ | $x^5 + x^4 + x^3 + 1$ |
| $X^{29}$ | $x^5 + x^4 + x^3$ | $X^{61}$ | $x^5 + x^4 + 1$ |
| $X^{30}$ | $x^5 + x^4 + x + 1$ | $X^{62}$ | $x^5 + 1$ |
| $X^{31}$ | $x^5 + x^2 + 1$ | $X^{63}$ | 1 |

According to the present invention, a plurality of streams of random numbers are used for an encryption key, in which a set of i elements consecutive in power number are selected from the elements $X^0$ to $X^{q-1}$ obtained in association with the irreducible polynomial and the respective polynomials for the selected elements are expressed in a binary number notation for use as an encryption key. Another set of i elements having a particular relation with the elements selected in enciphering is also expressed in a binary number notation to use it as the random numbers for a decryption key.

For instance, when 6 elements $X^7$ to $X^{12}$ starting from $X^7$ indicated by reference E in Table 1 are selected for use as an encryption key, $X^7$ to $X^{12}$ in a binary number notation of the respective polynomials are: $X^7$="000110", $X^8$="001100", $X^9$="011000", $X^{10}$="11000", $X^{11}$="100011" and $X^{12}$="000101".

In the encipher circuit of the invention, these bit patterns are arranged for use as encryption random numbers in the order of power as shown in FIG. 3. In enciphering, a message M of a binary number notation is arranged in such a way that the lowermost bit $m^0$ corresponds to the row 11 of $X^7$ and the uppermost bit $m^5$ to the row 16 of $X^{12}$. Only those streams of random numbers whose rows correspond with bit "1" in the message are used as an object of addition operation (mod 2 addition) for each bit of the random numbers. Assuming that the content of message M is "010101" as shown in FIG. 3, the random numbers located at the rows 11, 13 and 15 becomes an object to be operated, and a bit pattern "111101" shown in a block 4 becomes a cipher text.

In the above example, it can be understood that the bit pattern "010101" of the message M and "111101" of the cipher text respectively correspond to the polynomials of and $X^{59}$. Therefore, taking E (=7) as the degree of power of the reference element $X^7$ among the set of elements used in enciphering, M (=52) as for $X^{52}$, and S (=59) as for $X^{59}$, the above-described enciphering processing means that the following operation is performed through a partial product operation.

$$X^S = X^M \cdot X^E \quad (4)$$

In the decipher circuit of the invention, a received message is deciphered by using a partial product operation similarly to the case of enciphering. In this case, taking D as the degree of power of a reference element among the set of elements used for a decryption key, the deciphering processing can be expressed in the form of:

$$X^S \cdot X^D = X^M \quad (5)$$

Therefore, from the equations (4) and (5), as the degree D of a reference element among the elements selected for use as a decryption key, the value which meets the following condition can properly be selected.

$$D + E \equiv 0 \pmod{q} \quad (6)$$

wherein q is the number of elements the irreducible polynomial can take.

In this example, since q=63 and E=7, the value D sufficing the equation (6) becomes 56. As a result, as the decryption key forming a counterpart of the encryption key obtained from $X^7$ to $X^{12}$, six elements $X^{56}$ to $X^{61}$ starting from a reference $X^{56}$ indicated by reference D in Table 1 are used and the corresponding bit patterns $X^{56}$="011111" to $X^{61}$="110001" representative of the respective polynomials become the decryption random numbers. These random numbers are arranged in the order of power and the received cipher text S is arranged in such a way that lowermost bit $s^0$ corresponds to the row 11' of $X^{56}$ and the uppermost bit $s^5$ corresponds to the row 16' of $X^{61}$. The random numbers corresponding to bit "1" in the cipher text are selected as an object of addition operation (mod 2 addition) at each bit. The resultant bit pattern D equals the message prior to enciphering as shown in a block 4'.

It is possible to select any desired element $X^E$ for an encryption key in a single irreducible polynomial and select accordingly the element $X^D$ for a decryption key which corresponds to the element $X^E$. As the polynomials of the encryption and decryption keys, another irreducible primitive polynomial in the Galois field $GF(2^i)$ may be used. For example, Table 2 shows the elements which a fifth order irreducible polynomial, $f(x) = x^5 + x^2 + 1$ for example can take. In this case, $X^E$ and $X^D$ sufficing the relation of the equation (6) can be selected by setting q=32. The irreducible polynomial may be selected such that the order thereof corresponds to the bit length i of the message to be enciphered.

TABLE 2

| | $f = x^5 + x^2 + 1$ | | | |
|---|---|---|---|---|
| $X^n$ | $X^n = F \pmod{f}$ | | $X^n$ | $X^n = F \pmod{F}$ |
| $X^0$ | | 1 | $X^{16}$ | $x^4 + x^3 + x + 1$ |
| $X^1$ | x | | $X^{17}$ | $x^4 + x + 1$ |
| $X^2$ | $x^2$ | | $X^{18}$ | $x + 1$ |
| $X^3$ | $x^3$ | | $X^{19}$ | $x^2 + x$ |
| $X^4$ | $x^4$ | | $X^{20}$ | $x^3 + x^2$ |
| $X^5$ | $x^2 + 1$ | | $X^{21}$ | $x^4 + x^3$  D |
| $X^6$ | $x^3 + x$ | | $X^{22}$ | $x^4 + x^2 + 1$ |
| $X^7$ | $x^4 + x^2$ | | $X^{23}$ | $x^3 + x^2 + x + 1$ |
| $X^8$ | $x^3 + x^2 + 1$ | | $X^{24}$ | $x^4 + x^3 + x^2 + x$ |
| $X^9$ | $x^4 + x^3 + x$ | | $X^{25}$ | $x^4 + x^3 + 1$ |
| $X^{10}$ | $x^4 + 1$ | | $X^{26}$ | $x^4 + x^2 + x + 1$ |
| $X^{11}$ | $x^2 + x + 1$ | | $X^{27}$ | $x^3 + x + 1$ |
| $X^{12}$ | $x^3 + x^2 + x$ | | $X^{28}$ | $x^4 + x^2 + x$ |
| $X^{13}$ | $x^4 + x^3 + x^2$ | | $X^{29}$ | $x^3 + 1$ |
| $X^{14}$ | $x^4 + x^3 + x^2 + 1$ | | $X^{30}$ | $x^4 + x$ |
| $X^{15}$ | $x^4 + x^3 + x^2 + x + 1$ | | $X^{31}$ | 1 |

Figure 5:
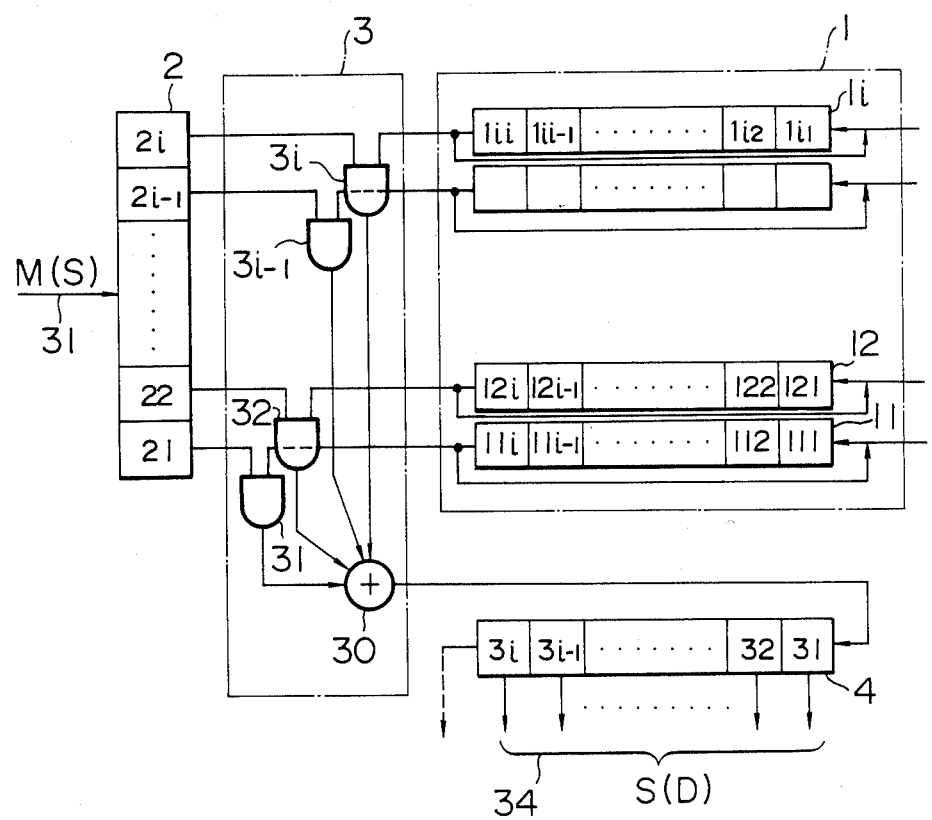
FIG. 5 is a circuit diagram showing one example of enciphering and deciphering circuits according to the present invention.

FIG. 5 shows an example of the construction of a circuit for performing the above-described enciphering operation. In the figure, reference numberal 1 represents a memory for storing polynomial bit patterns of binary number notation to be used as random numbers. The memory 1 is constructed of i shift registers $1l$ to $1i$. Reference numeral 2 represents an i bit input register to which a message M is inputted, the content of each bit is outputted in parallel. Reference numeral 3 denotes an operation circuit which includes 2-input AND circuits $3l$ to $3i$ corresponding to each bit $2l$ to $2i$ of the register 2 and an adder 30 for performing a mod 2 addition of the outputs from the AND circuits. Reference numeral 4 denotes an i bit output shift register to which an output of the adder 30 is inputted successively. The shift registers $1l$ to $1i$ start shifting every time when the message is inputted to the input register 2, and sequentially output the bit patterns from the uppermost bits $1li$ to $1ii$ to the lowermost bits $1ll$ to $1ii$. These outputs are respectively inputted to the AND circuits $3l$ to $3i$. To the other input terminal of each AND gate $3l$ to $3i$, each bit output from the input register 2 is applied. Only those AND gates corresponding to bit "1" in the message supply each bit signal from the shift registers to the mod 2 adder 30.

As a result, if the polynomial bit patterns for i elements are previously arranged to be stored in the memory 1 in such a way that a bit pattern of the polynomial $$X^E = C_{i-1} \cdot X^{i-1} + \ldots C_0 \pmod{f_{1(x)}} \quad (7)$$

representative of a reference for the encryption key is located at the shift register 11, and a bit pattern of the polynomial $$X^{E+i-1} 5 l_{i-1} \cdot X^{i-1} + \ldots + l_0 \pmod{f_{i(x)}} \qquad (8)$$

is located at the shift register $1i$, then the operation circuit 3 can perform the encryption operation for the i bit input message as described with FIG. 3. The resultant cipher text is sequentially inputted to the output register 4.

Each shift register $1l$ to $1i$ is constructed such that the output bit is re-entered into the lowermost bit upon every shift operation. Therefore, at the end of enciphering of the message, the contents of each register resume the initial state, enabling accordingly to perform an encryption operation of the following message.

It can be understood by reference to FIGS. 3 and 4 that the decryption operation of the invention can be performed with the same procedure as that in the encryption operation. Thus, the circuit of FIG. 5 per se can be adopted as a decipher circuit. By storing bit patterns forming a decryption key into the respective shift registers in the memory 1, and deciphering a cipher text S inputted to the input register 2, it is possible to obtain the original message at the output register 4.

Next, a modification of the present invention will be described.

Referring to FIG. 3, if the elements $X^7$ and $X^8$ forming part of the encryption key is arranged to transpose their relative position, the elements corresponding bit "1" in the message M="010101" become $X^8$, $X^9$ and $X^{11}$, so that the bit pattern of the cipher text S is changed to "110111" By setting this bit pattern at the block $2'$ of FIG. 4 and performing a decryption operation, a deciphered message D to be obtained at the block $4'$ becomes "010110" whose bit pattern contains two transposed lower bits of the bits $m^0$ and $m^1$ of the message M. From this, it can be understood that if the elements $X^7$ and $X^8$ are transposed at the encipher circuit side, the streams of bits $x^0$ and $x^1$ corresponding to the transposed bits $m^0$ and $m^1$ are arranged to be transposed in the decryption bit pattern matrix at the decipher circuit side so as to decipher the cipher text into a correct original message. In particular, therefore, if the elements $X^9$ and $X^{11}$ are transposed at the encipher circuit side, the decipher circuit side may prepare such bit patterns whose bit streams $x^4$ and $x^2$ corresponding to the bits $m^4$ and $m^2$ are transposed. Thus, as the arrangement of elements forming an encryption key is transposed at the encipher circuit side, cryptoanalysis of the ciphertext illegally obtained during data transmission becomes more difficult, thereby further improving the security of data.

The random numbers (bit pattern) for enciphering and deciphering to be set in each shift register in the memory 1 can be supplied to each node from the data processor 30.

In order to generate polynomial bit patterns serving as random numbers, it is necessary for those persons at the two nodes for data transmission to previously be informed of: an irreducible polynomial f(x) forming the basis of enciphering and deciphering; the order E of a reference element used as part of the encryption key; and the arrangement $K_E$ of the encryption key. These information may be provided via another route other than the above data transmission channel.

Figure 6:
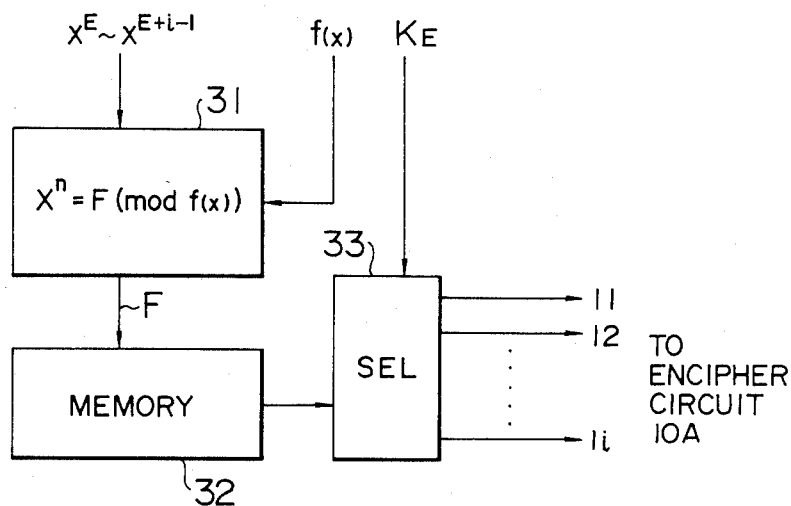
FIG. 6 is a flow chart illustrating a sequence for generating random numbers to be used as an encryption key.

FIG. 6 schematically shows an operation flow performed by the data processor 30 for effecting formation of encryption random numbers. Bit patterns necessary for encryption can be obtained at block 31 by performing division of the i elements expressed in a power form starting from $x^E$ by the irreducible polynomial f(x) and by calculating its remainder. These bit patterns are temporarily stored at block 32 in the memory. As all of the bit patterns have been prepared, the bit patterns are sequentially read from the memory in accordance with the arrangement designation $K_E$ of the encryption key. The read-out bit patterns are then transferred to the shift registers $1l$ to $1i$ in the encipher circuit 10A. The above-described transposition in the encryption key can be performed in accordance with the arrangement designation $K_E$.

Figure 7:
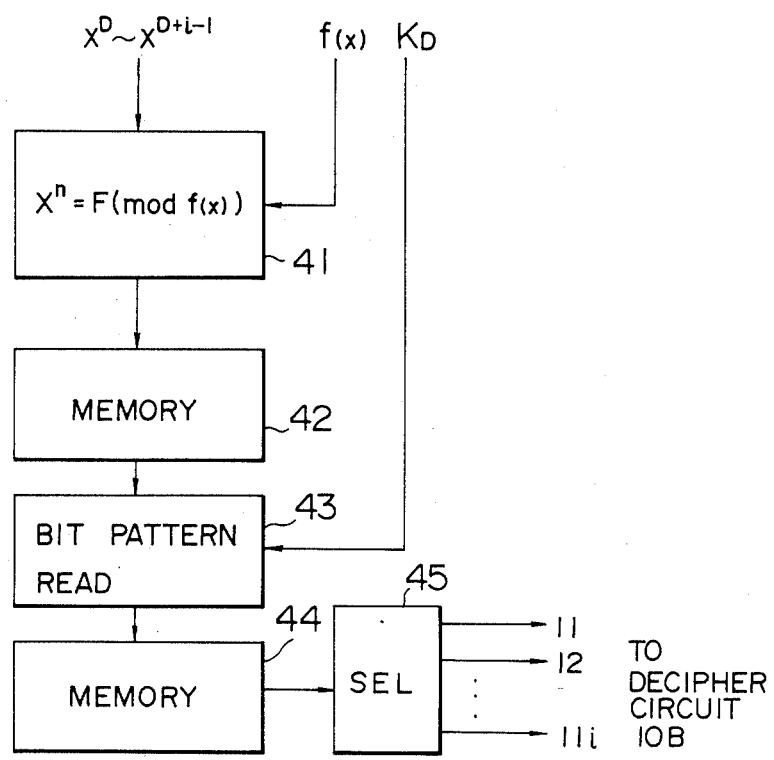
FIG. 7 is a flow chart illustrating a sequence for generating random numbers to be used in a decryption key.

FIG. 7 schematically shows an operation flow for generating decryption random numbers. Bit patterns forming the basis of decryption are obtained at block 41 by dividing the i elements starting from $x^D$ by the irreducible polynomial f(x). The bit patterns representative of the remainders are temporarily stored at block 42 in the memory. As all of the bit patterns have been prepared, the bit streams are read out at block 43 in accordance with the arrangement designation $K_D$ of the decryption key to restore them in the memory (block 44). After the end of transposition of the bit streams, at block 45 the bit patterns corresponding to $x^D$ are sequentially read to transfer them sequentially to the shift registers $1l$ to $1li$ in the decipher circuit 10B.

The elements $x^D$ for the decryption key can be unanimously obtained if f(x) and $x^E$ are identified. The arrangement designation $K_D$ for the decryption key can also be obtained unanimously based on the arrangement designation $K_E$ for the encryption key.

Enciphering and deciphering of a message using random numbers of the bit patterns of the elements have been described by way of example by using an irreducible primitive polynomial in the Galois field $GF(2^i)$. However, other polynomials whose elements have a periodical property shown by $$X^S \equiv 1 \pmod{fi(x)} \qquad (91)$$

may also be used for the encryption and decryption keys. In this case, the following relationship between $x^E$ and $x^D$ is established:

$$E + D \equiv 0 \pmod{s} \qquad (10)$$

Furthermore, although enciphering and deciphering have been applied to data transmission in the above embodiments, it is apparent that enciphering and deciphering of the present invention may also be adopted for protection of file data in a general computer system.

I claim:

1. A system for enciphering or deciphering i binary digit data comprising:

first store means for temporarily storing input data to be enciphered or deciphered;

second store means for storing a matrix formed by a plurality of streams of i binary digit random numbers, each stream corresponding to a respective digit of said first store means; and output means for outputting a signal as encryption or decryption data for said input data, said signal being obtained by performing mod 2 addition of the streams of random numbers, among a plurality of streams stored in said second store means, which correspond to those digits of the input data store in said first store means and having a "1" bit, said addition operation being performed independently for each digit of said random numbers;

wherein said plurality fo streams of random numbers to be stored in said second store means respectively correspond to i element consecutive in power number and selected from the $(2^i-1)$ elements of an i order irreducible primitive polynomial in the Galois field $GF(2^i)$.

2. A system as set forth in claim 1, wherein if in encryption operation the polynomials stored as the random numbers in said second store means correspond to the elements $x^E$ to $x^{E+i-1}$ in a power form, then in decryption operation the polynomials stored as the random numbers in said second store means correspond to the elements $x^D$ to $x^{D+i-1}$ in a power form, wherein $E+D \equiv 0 \pmod{2^i-1}$.

3. A system as set forth in claim 1, wherein
said second store means comprises i shift registers, each storing a stream of i digit random numbers;
said first store means comprises an input register for outputting in parallel i digit input data; and
said addition means comprises a plurality of AND circuit means provided for each digit of said input register for performing an AND between a one digit output from said input register and an output from said shift register corresponding to said one digit, and an adder for performing a mod 2 addition operation of the outputs from said plurality of AND circuit means.

* * * * *